(12) United States Patent
Tam et al.

(10) Patent No.: US 8,332,954 B2
(45) Date of Patent: Dec. 11, 2012

(54) METHODS FOR EMBEDDING DATA IN DIGITAL AUDIO DATA (75) Inventors: Kar Yan Tam, Kowloon (HK); Kai Fung Tsang, Kowloon (HK); Sai Ho Kwok, Kowloon (HK); Shing Chi Cheung, Chai Wan (HK)

(73) Assignee: The Hong Kong University of Science and Technology, Kowloon (HK)

( * ) Notice: Subject to any disclaimer, the term of this patent is extended or adjusted under 35 U.S.C. 154(b) by 2443 days.

(21) Appl. No.: 09/965,831

(22) Filed: Oct. 1, 2001

(65) Prior Publication Data
US 2003/0068043 A1 Apr. 10, 2003

(51) Int. Cl.
*G06F 21/00* (2006.01)
(52) U.S. Cl. .......................................... 726/27; 705/57
(58) Field of Classification Search .................. 713/176
See application file for complete search history.

(56) References Cited

U.S. PATENT DOCUMENTS

| | | | | |
|---|---|---|---|---|
| 5,636,292 | A * | 6/1997 | Rhoads | 382/232 |
| 6,226,618 | B1 * | 5/2001 | Downs et al. | 705/1 |
| 6,697,944 | B1 * | 2/2004 | Jones et al. | 713/168 |
| 6,714,683 | B1 * | 3/2004 | Tian et al. | 382/240 |
| 2002/0027994 | A1 * | 3/2002 | Katayama et al. | 380/269 |

FOREIGN PATENT DOCUMENTS

WO WO99/23657 5/1999

OTHER PUBLICATIONS

Bruce Schneier, Applied Cryptography, 1996, John Wiley & Sons, Inc, pp. 351-353, 355.*

* cited by examiner

*Primary Examiner* — Benjamin Lanier
(74) *Attorney, Agent, or Firm* — Turocy & Watson, LLP (57) ABSTRACT

The present invention provides a method of embedding watermarking data in an audio signal which includes the steps of incorporating watermarking information into said audio signal, sectioning said signal into at least two sections, marking at least one said section whereby said sections may be identified, generating distortion in one said section of said signal in manner recoverable by a key obtainable from at least one other said section, and appending said distorted section to said at least one other section to form a composite signal comprising a distorted section to said at least one other section to form a composite signal comprising a distorted section and at least one undistorted section. The present invention is particularly useful for enabling advertisements and or trial listening sections to be added to an audio file in such a manner that they include the key for recovering a distorted section. If an attempt is made to remove the advertisement or trial section, then the key would be lost.

29 Claims, 4 Drawing Sheets

METHODS FOR EMBEDDING DATA IN DIGITAL AUDIO DATA

FIELD OF THE INVENTION

This invention relates to methods for embedding data such as copyright data in digital audio data. The invention further relates to methods for the provision of advertising material in digital audio data, and to methods for providing trial versions of digital audio data prior to purchase.

BACKGROUND OF THE INVENTION

The provision of an audio signal, especially music, in a digital form is becoming an increasingly popular method of distributing digital data. Increasingly, however, as music and other audio data is increasingly being distributed by downloads and file sharing, rather than being provided in a hardware form such as a compact disc, the ease with which data can be copied makes commercial applications of digital music distribution problematic.

There is a need for example for copyright material to be embedded in a digital data file in such a manner that it can be determined whether or not a digital audio data file is an authorized file, or an illegal copy. To ensure the integrity of such a system, the copyright material needs to be secure and free from tampering. Similarly it would be desirable for commercial reasons to be able to introduce advertising material into a digital audio file, but such advertising material also needs to be secure if it is to be effective. The purpose of including the advertising material would be lost if it could easily be removed from the digital audio data file. It would also be commercially useful to be able to provide prospective purchasers of a trial version of a digital audio data file prior to purchase, but if the trial version can be copied and circulated itself, then this would be counter-productive.

PRIOR ART

To date there exists no suitable techniques for meeting these commercial objectives completely satisfactorily. An example of the prior art is shown in WO99/23657 that provides a technique for adding an advertisement to a digital audio signal.

In WO99/23657 a music signal and an advertisement signal are combined by a synthesizing section and the combined signal is encoded by a first encoding section. The advertisement signal alone is then encoded by a second encoding section. In this system if a user does not have the relevant encryption key information, the music can only be played with the advertisement. However if a user has the encryption key then the advertisement signal can be removed and the music can be played on its own. The system of WO99/23657, however, requires a proprietary encoding system, and does not provide any means for embedding copyright information.

Other techniques for commercializing the distribution of digital audio data files include various rights management systems, all of which however require user authentication and server/client communications. Other systems of note include EverAd (http://www.everad.com) that embeds banner advertisements in free music tracks. When a track is being played a sequence of advertisements is shown. This system requires a dedicated player however, and does not include copyright material. Digital Payloads (http://www.digitalpayloads.com/) provides a technology that embeds audio advertisements in MP3 files and provides a mechanism to track the location, customer profile and so on where the advertisement is being played.

None of the prior art techniques meet all the commercial needs and none of them have had widespread success and acceptance. It is an object of the present invention to provide methods for facilitating the commercial online distribution of music and other digital audio files in a manner that has not been achieved to date.

SUMMARY OF THE INVENTION

According to the present invention there is provided a method of embedding watermarking data in an audio signal, comprising the steps of:
 (a) incorporating watermarking information into said audio signal,
 (b) sectioning said signal into at least two sections,
 (c) marking at least one said section whereby said sections may be identified,
 (d) generating distortion in one said section of said signal in a manner recoverable by a key obtainable from at least one other said section, and
 (e) appending said distorted section to said at least one other section to form a composite signal comprising a distorted section and at least one undistorted section.

Preferably the key is embedded in said at least one other said section.

The distortion may for example be generated by creating a pseudo-random number sequence for adding as pseudo-random noise to said first said section, and wherein said pseudo-random number sequence is embedded in said at least one other section to enable said random noise to be subsequently removed. Alternatively the first section may be distorted by means of a scrambling function.

As an alternative to embedding the key, the key may be obtained directly from a sequence of bits contained in said at least one other said section. For example the key may be obtained by applying a hawing function to the bit sequence of said at least one other said section. For example, the output of the bating function could be added to the bitstream of said first section to create said distortion. Alternatively the bitstream of said first section is subject to a scrambling function to create said distortion.

In use of the present invention the first section comprises a section to which access is to be restricted, while the at least one other section may for example be an advertisement, or trial listening section or the like.

The audio signal may also be compressed after watermarking.

The invention also extends to a method of playing back an audio signal having data embedded within it by the method, comprising;
 (a) reading said composite signal,
 (b) identifying said sections,
 (c) obtaining said key from said at least one undistorted section, and
 (d) recovering said distorted section.

Viewed from a further aspect the invention also provides a watermarked audio signal comprising at least two sections, including a first section which is distorted in a manner recoverable by means of a key obtainable from at least one other section.

The invention still further provides apparatus for embedding watermarking data in an audio signal, comprising:
 (a) means for incorporating watermarking information into said audio signal, (b) means for sectioning said signal into at least two sections, (c) means for making at least one said section whereby said sections may be identified, (d) means for generating distortion in one said section of said signal in a manner recoverable by a key obtainable from at least one other said section, and (e) means for appending said distorted section to said at least one other section to form a composite signal comprising a distorted section and at least one undistorted section.

The invention still further provides a method for including an advertisement with audio data in an audio signal comprising, sectioning said signal into a first section and an advertisement section, generating distortion of said first section in a manner recoverable by a key obtainable from said advertisement section, and appending said distorted first section to said advertisement section.

Viewed from another aspect the invention provides a method for including a trial listening section with audio data in an audio signal comprising, sectioning said signal into a first section and a trial listening section, generating distortion of said first section in a manner recoverable by a key obtainable from said trial listening section, and appending said distorted first section to said advertisement section.

Viewed from a further aspect ft invention provides a method for including an advertisement section and a trial listening section with audio data in an audio signal including sectioning said signal into a first section, an advertisement section and a trial listening section, marking at least one of said sections whereby said sections may be identified, generating distortion in said first section in a manner recoverable by a key obtainable from at least one of said advertisement and trial listening sections, and appending said distorted first section to said advertisement and trial listening sections to form a composite signal.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
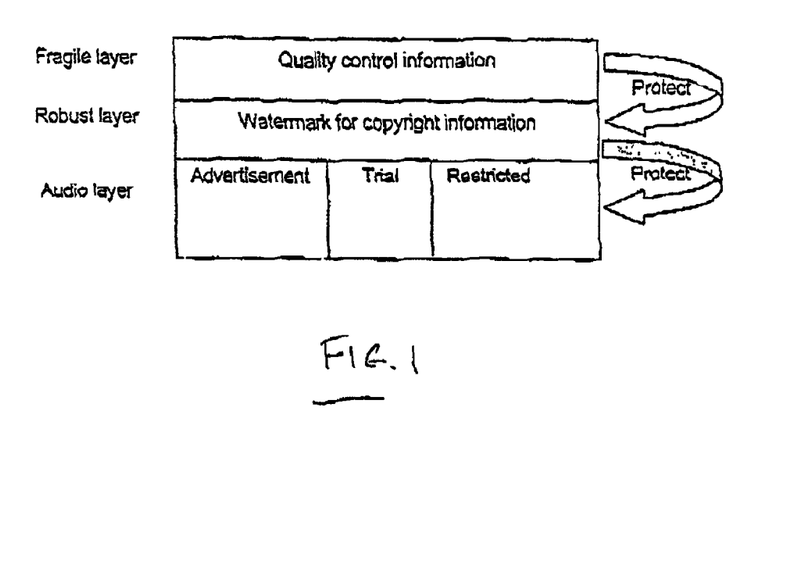
FIG. 1 is a schematic illustration of an underlying principle of the present invention.

Referring firstly to FIG. 1 there is shown an overview of the basic concept underlying, the present invention. A digital audio data file in an embodiment of the present invention may be considered as comprising three layers: an audio layer, a robust watermark layer, and a fragile quality control information layer. As will be understood from the following description, the robust watermark layer serves to protect the audio layer, and the fragile quality control information layer indirectly serves to protect the watermark layer. In this specification the term "robust" means that the data being embedded in a host or carrier can withstand compression, filtering, transporting, format converting and intentional or non-intentional attacks on the host or carrier, while the term "fragile" means that the data cannot withstand such operations.

The basic contents of each of these three layers will first be described in turn.

In the embodiment shown in FIG. 1 the audio layer consists of three sections: an advertisement section, a trial section and a restricted section. The advertisement section contains a digitized audio signal corresponding to an advertisement. This may be compressed (eg MP3) or uncompressed. The trial section contains a portion of the main audio material that is intended to enable a prospective purchaser to sample the audio material before deciding whether or not to purchase it. The restricted section contains the proprietary material itself and may be compressed or uncompressed. Importantly, the proprietary material in the restricted section is subject to a degree of imposed imperfection or distortion as will be discussed flyer below. The advertisement section and the trial section are not subject to such deliberately imposed imperfection.

The robust watermark layer contains copyright information, owner information, transaction information or the like as may be required from application to application. This digital watermark information is embedded in the audio data using a known robust watermarking technique. Once the watermark information is embedded in the audio data, it will remain as part of the audio data even if that data is copied, recorded or transcorded. This watermark information provides a mechanism for copyright control.

The fragile quality control information layer contains the information, such as a key, essential for correcting the deliberately imperfect or distorted audio data in the restricted section of the audio layer. In order to be able to play back the restricted audio signal without distortion or imperfection, the correct key must be extracted from the quality control information. The quality control information signal is embedded within the audio signal using a fragile data hiding technique. Because the quality control information is embedded in this fragile manner, if any attempt is made to tamper with the audio data signal, the quality control information will be damaged and it will not be possible to playback correctly the restricted section of the audio layer.

Similarly, because the watermark information is embedded in a robust manner compared with the fragile manner of the quality control information, if an attempt is made to corrupt, alter or remove the watermark information, then the quality control information will be destroyed. Equally it would not be possible to remove the advertising section without destroying the quality control information.

Figure 2:
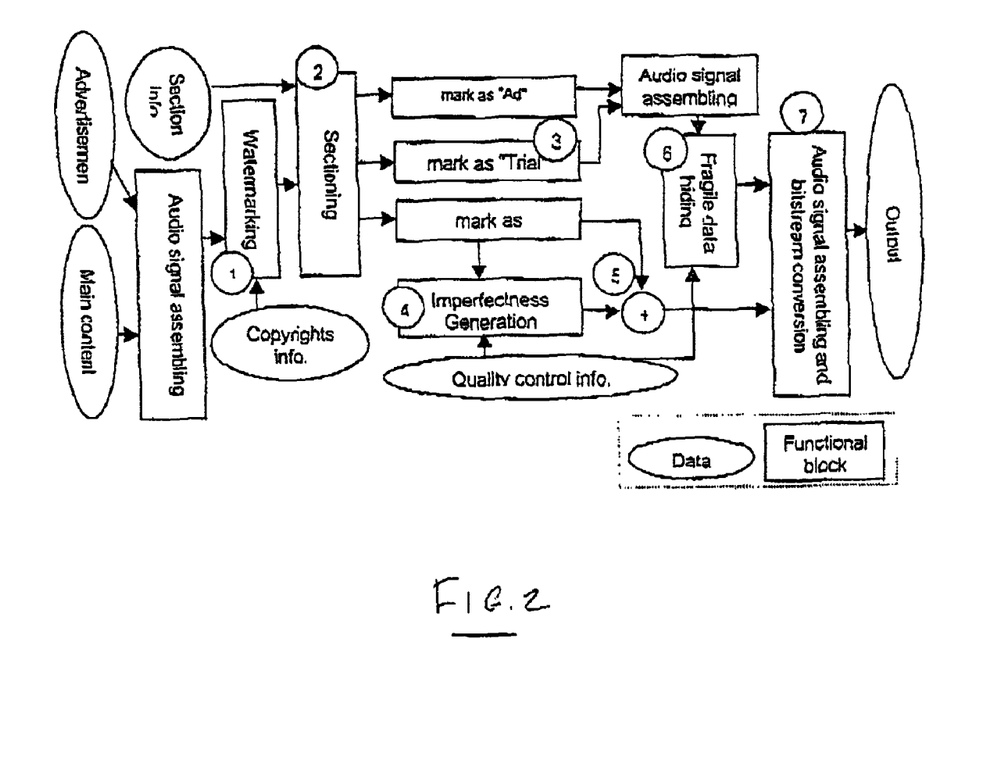
FIG. 2 is a block diagram showing the preparation of an audio signal according to a first embodiment of the present invention.

FIG. 2 is a block diagram illustrating how the digital audio data file is assembled in an embodiment of the invention. Beginning on the left of the Figure, the audio signal is assembled by adding audio advertising material to the main content, eg a song or sequence of songs. The audio signal that is thus assembled is then watermarked by adding copyright, license and/or user information or the like using a robust data hiding technique. This copyright etc. information is provided from an external source (eg the owner of the main content material) and thus embedded in the audio signal.

The audio signal is then sectioned into three parts marked as "Ad" (advertisement), 'Trial' (a section of the main content to be provided for trial listening) and "Restricted" (the main content material). The sectioning information is predetermined and is provided from an external source. It should be noted here that the provision of advertising material and the provision of a trial section are both only preferred but non-essential parts of the invention. That is to say, while they are both preferred because they provide added functionality, without them the present invention still provides the significant advantage of providing secure watermarking of the main content material.

Following the marking of the three sections of the audio signal, imperfectness is generated in the restrioted section of the audio signal. This imperfectness is linked with quality control information that is provided from an outside source. The quality control information includes key information for both generating the imperfectness and for subsequently recovering the correct version of the restricted section for playback. This key information is embedded in the advertising and trial version sections using a fragile data hiding technique. The three sections are then assembled as a single bitstream to an output for writing to memory.

As a more detailed example of the invention, the audio signal may be a pulse code modulation (PCM) signal. The PCM signal may itself either be compressed or uncompressed (eg into a MP3 format) by the addition of a compression module. If the audio signal is a PCM signal, the watermarking may be achieved by using the standard robust watermarking function robustMark(PCM_signal KEY1, MESSAGE), where the PCM_signal is the PCM audio signal, and KEY1 and MESSAGE are supplied externally, with MESSAGE being the copyright or the like information that is to be included as a watermark encoded as binary sequence. The function robustMark(PCM_signal, KEY1, MESSAGE) will return a watermarked PCM signal PCM_signal' that replaces the original PCM signal. This watermarked signal is then sectioned into three sections PCM_ad (advertisement), PCM_tr (trial), and PCM_re (restricted). The section information specifies the starting time T_ad, T_tr, and T_re of the advertisement, trial and restricted sections respectively. For example, if the PCM signal is sampled at 44.1 kHz, 16 bits, stereo, and assuming that the left and right channel samples are stored alternately, (ie if two bytes is the left channel, and the next two bytes is the right channel), the offset (in bytes) of the trial listening section specified by time T_tr is equal to time×sampling frequency×bytes per sample×number of channels=T_tr*44100*2*2 bytes.

The marking module marks the three signals using the function sectionMark( ), which may be the same function as robustMark( ), using KEY 2. For example, the trial listening section would be marked by sectionMark(PCM_tr, KEY2, "trial"). To retrieve the mark correctly, the same KEY 2, has to be provided to the extraction process. In practice, it may be sufficient to mark only the trial listening section to distinguish between the three sections, and the advertisement and restricted sections need not be marked. This is because in this example the trial listening section is the middle of three sections, and thus marking that section is sufficient to separate the three sections from each other. If the advertisement section were the middle son then that section could be marked. If there are more than three sections, for example if there are multiple trial listening sections or multiple advertisement sections, then it may be necessary to mark all sections.

Following marking, imperfectness is generated and applied to the restricted section. Any suitable form of generating imperfectness may be used, but in this example pseudo-random noise may be imposed on the restricted section. To achieve, this a pseudo-random number generator function RAND(KEY_control, L) generates a sequence of numbers of length L. These L numbers are added to the restricted section PCM_re to L audio samples of each channel and are repeated for the next L samples until the end of the audio sequence. This noise sequence distorts the restricted section and forms PCM_distorted. KEY_control used in RAND( ) is the seed for the pseudo-random number generation, and therefore KEY_control is the quality control information that is needed to remove the distortion in the restricted section and allow the undistorted audio signal to be recovered. The KEY_control is therefore passed to the fragile data hiding module that embeds the KEY_control in the audio signal of PCM_ad and PCM_tr in a fragile manner using the function fragilemark ([PCM_ad, PCM_tr], KEY 3, KEY_control). To retrieve the KEY_control, KEY3 has to be provided to a retrieval module.

Finally the restricted section is appended to the end of the fragile marked advertisement and trial sections to a form a packages signal that is then transformed back to bitstream domain and written to memory.

Figure 3:
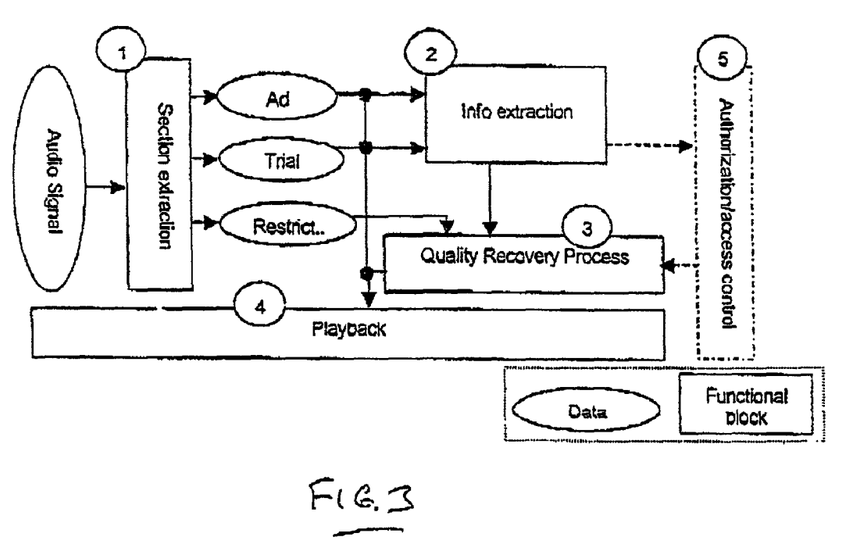
FIG. 3 is a block diagram ideating the playback of an audio signal prepared in accordance with the embodiment of FIG. 2.

FIG. 3 illustrates how the audio signal packaged by the method of FIG. 2 may be played back. Firstly the bitstream signal is converted to PCM format and the three sections (advertisment, trial, restricted) are extracted by the function sectionExtract(PCM_data, KEY2) where KEY2 is the key used in the marking stage. The function sectionExtract( ) returns the starting times T_ad, T_re, T_re, of the three sections and according to this timing information the audio signal is divided into three sections. Once the advertisement PCM_ad and trial PCM_tr sections have been located playback of these sections is commenced. At the same time the advertent and trial sections are passed to a fragile layer extraction module in which the function fragileExtract([PCM_ad, PCM_tr], KEY3) returns the KEY_control which is embedded in the advertisement and trial sections. It will be understood that in the function fragileExtract( ) the keyKEY3 must be the same key as was used to embed the quality control information in those sections.

Once KEY_control has been extracted from the advertisement and trial sections, it is passed to a recovery module for recovery of the original undistorted restricted section of the audio signal. In particular, the function RAND(KEY_control, L) is used to once again generate the same sequence of pseudo-random numbers which were added to PCM re in the imperfectness generation, and by now subtracting these numbers from PCM_distorted the original restricted audio signal is recovered for playback. This recovery process is carried out in real time and the recovered signal is passed to a buffer section for playback. This means that the recovered signal is not written to memory, and this provides added security as it is not possible to recover the signal once and then to copy it multiple times.

From the above description it will be understood that to play back the restricted audio signal KEY_control must be retrieved from the fragile marked advertisement and trial listening sections. To do this a user needs KEY3 and this may, for example, be purchased from the owner of distributor of the copyright material. Furthermore, if any attempt is made to remove the advertisement or trial listening section, the KEY_control will be lost and it will not be possible to recover the undistorted restricted audio signal. Another advantage of the present invention is that if any attempt is made to alter, remove or otherwise tamper with the watermark information, then again this will result in the loss of the KEY_control information and ability to recover the original restricted audio signal. The fact that the quality control information is embedded in a fragile manner, whereas the copyright information is embedded in a more robust manner, means that if the quality control information is present there is a strong probability or likelihood that the copyright information has not been tampered with or compromised.

Figure 4:
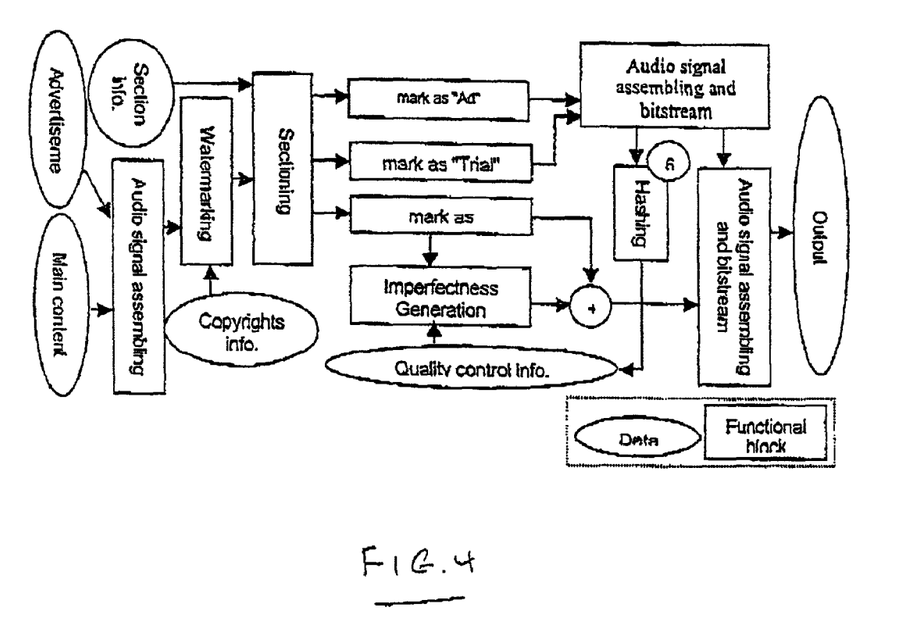
FIG. 4 is a block diagram showing the preparation of an audio signal according to a second embodiment of the present invention.

FIG. 4 illustrates a second embodiment of the invention. In this embodiment the fragile embedding of the quality control information in the advertisement and trial sections is replaced by a hashing function. This may be preferable because although the function fragileMark( ) is designed to minimise audible distortion of the original section, nevertheless small audible artifices may exist in the marked signal. Therefore instead of embedding in the advertisement and trial sections quality control information provided for an external source, the quality control information is generated from the advertisement and trial sections using a hashing function HASH( ) such as the Secure Hash Algorithm (SHA-1) as specified by Federal Information Processing Standards Publication 180-1.

The Function HASH(I) takes an input I and returns a message digest H which can serve as quality control information. An advantage of the HASH( ) function is that given H it is very difficult to reconstruct I, and that it is very difficult to find two inputs that produce the same output H. This means that any changes made to the advertisement and trial sections (for example by unauthorised tampering) will affect the hashing output and hence will corrupt the quality control information. The HASH( ) function preferably works on the bitstream domain and therefore in the embodiment of FIG. 4 the advertisement and trial sections are marked and assembled together before being converted into bitstream format and then supplied as an input to the hashing function as well as an input to the assembly of the final audio signal. The output of the hashing function is then supplied as quality control information to the imperfectness-generating module. It will be understood that in a playback stage, the advertisement and trial sections must be again provided as an input I to the hashing function HASH( ) to generate the output H which of course corresponds to the quality control information and which is therefore essential to recovery of the distorted restricted signal. Thus any attempt to remove, alter, or otherwise tamper with the advertisement and trial sections will mean that a different output from the hashing function would be obtained which would not be the correct quality control information needed for recovery of the restricted section.

Figure 5:
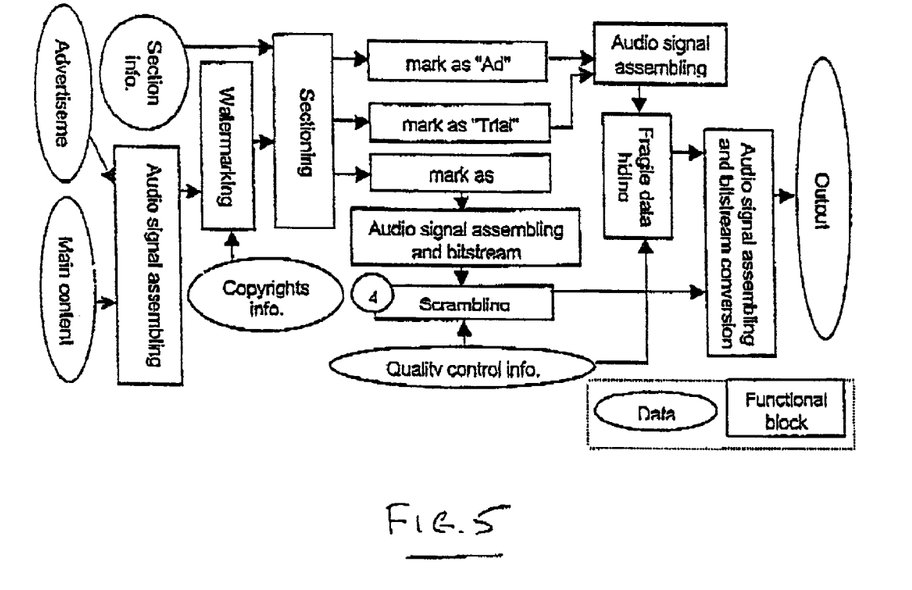
FIG. 5 is a block diagram showing the preparation of an audio signal according to a third embodiment of the present invention.

In the first embodiment of the invention described with reference to FIG. 2, the imperfectness or distortion in the restricted section is generated by using a pseudo-random noise sequence that is added to the restricted section. This method may be disadvantageous in that the audio signal my be clipped after the addition of the noise and there may be imperfect recovery. To avoid this problem, as an alternative the restricted section may be subject to a scrambling operation as shown in FIG. 5.

In this embodiment the restricted section is scrambled using the function SCRAM(DATA, KEY_control) where KEY_control is the quality control information that must be provided to descramble the data subsequently. The quality information KEY_control may be provided externally and then embedded in the advertising and trial sections as in the embodiment of FIG. 2, or it may be provided by the output of a hashing function that operates on the advertisement and trial sections as in the embodiment of FIG. 4. FIG. 5 illustrates this latter possibility. Before passing to SCRAM( ), the restricted section is quantized and format to bitstream domain to avoid quantization errors.

Any suitable scrambling function may be used in this embodiment, and a simple scrambling function will be described as an example.

SCMAM(DATA, KEY_control) returns a scrambled bitstream of DATA of the same length as DATA. KEY_control is a 160-bit message digest output from HASH( ). In this example, SCRAM( ) is simply a XOR function where XOR (S,T) is the logical symmetric difference of elements S and T. The result is 1 where either S or T is 1 but not the other, while the result is 0 if both S and T are 1 or both are 0. For the purposes of the present invention, XOR is particularly useful because if X=XOR(S,T) then S can be easily recovered because S=XOR(X,T). Thus the scrambling and descrambling functions are the same. In this example, the pseudo-code of SCRAM( ) is as follows:

```
1. OUT=SCRAM(DATA, KEY_control)
2. k=0
3.          For i = 0
4.              OUT[i] = XOR(DATA[i],KEY_control[k]);
5.              i = i + 1
6.              k = k + 1
7.              If i ≧ length of DATA
8.                  exit
9.              If k ≧ 160
10.                 k = 0
11. end
``` where DATA[i] represents the i-th bit of the bitstream DATA and KEY_control[k] represents the k-th bit of the bitstream KEY_conrol.

Figure 6:
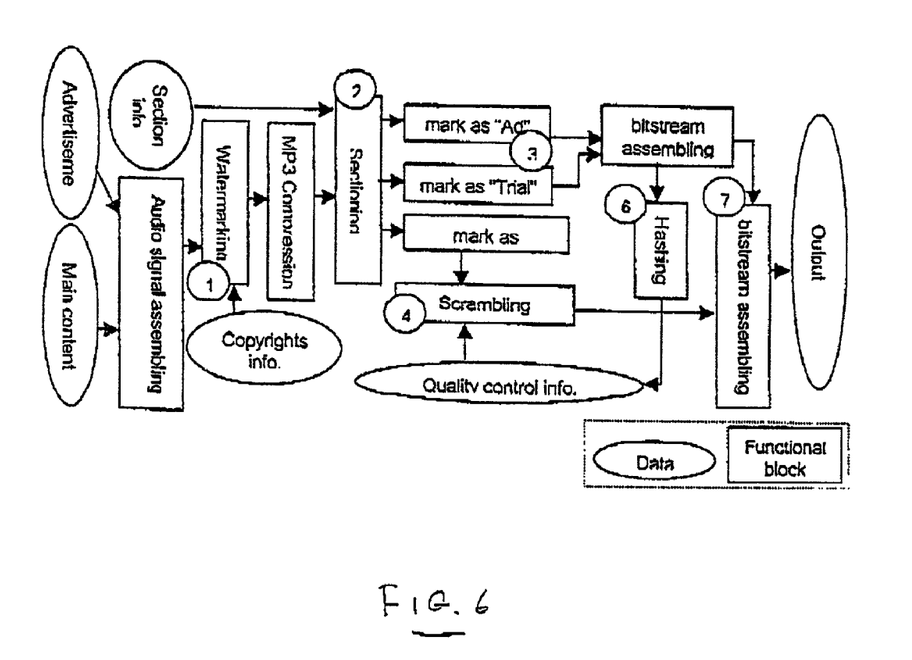
FIG. 6 is a block diagram showing the preparation of an audio signal according to a fourth embodiment of the present invention where the audio signal is a MP3 signal.

Because both hashing and scrambling are functions that are applied directly to the bitstream instead of manipulating the PCM signal, it is possible to use these functions in an embodiment of the invention that uses a compressed audio bitstream, for example the common audio format MPEG 1 Layer III (MP3). FIG. 6 illustrates an embodiment of the invention as it relates to an MP3 format audio signal.

In this embodiment of the invention, the watermarked PCM audio signal output from the watermarking module is passed to a compression module for MP3 compression. The compression module returns a compressed bitstream in MP3 format. Subsequent processing is carried out in the bitstream domain which speeds up the processing time and avoids the introduction of quantization errors.

In this embodiment the sectioning module works on the MP3 frames and divides the MP3 bitstream into three sections F_ad, F_tr, and F_re which specify respectively the frame offset of the advertisement, trial and restricted sections respectively. The sections may then be marked by modifying bits in the frame headers that do not relate to the original audio data, such as the "private_btr", "copyright" and "original/copy" bits. In this embodiment of the invention the "original/copy" bit is used by assigning "1" to the "original/copy" bit for the frame headers of the trial sections, whereas in the frame headers of the advertising and restricted sections this bit is set to 0. Using one bit is sufficient to distinguish between the three sections in an advertisement, trial, restricted patterned audio signal.

The restricted section is then scrambled using the function SCRAM(DATA, KEY_control). The quality control information is supplied by hashing the bitstream of the advertisement and trial listening section using the HASH( ) function. The SCRAM( ) function works only on the "audio_data" parts of the MP3 frames and therefore the format of the restricted section is unchanged, but the audio data is scrambled and playback would be distorted without the quality control information. The scrambled restricted section is then appended to the advertisement and trial listening sections to form one single MP3 bitstream that can then be written to secondary memory for distribution.

Figure 7:
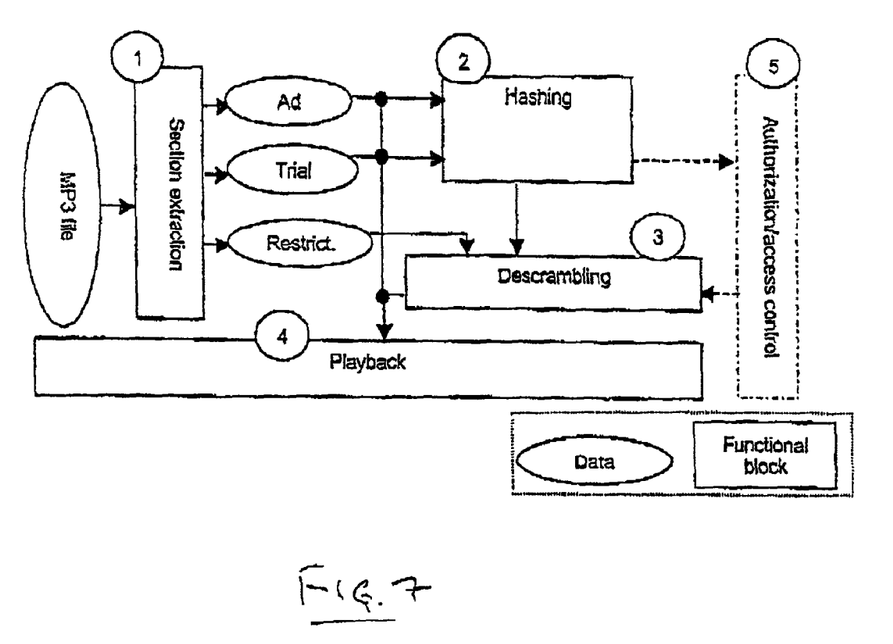
FIG. 7 is a block diagram illustrating the playback of the signal of FIG. 6.

As shown in FIG. 7, in a playback phase, the MP3 bitstream is first divided into its three section by the function sectionExtract( ) based on the marking performed by the hidden bits in the fare headers. The advertisement and trial sections are then passed to a hashing module to generate the HASH( ) output that is the KEY_control for the descrambling process. DESCRAM(audio_data, KEY_control) returns the original audio data only if the KEY_control is the same as is used in SCRAM( ). This will be the case provided that no attempt has been made to alter, remove, or otherwise tamper with the advertisement and trial listening sections. This ensures the integrity of the advertisement and the embedded robust watermark. The descrambling is carried out in real time such that partial descrambled frames are passed to a buffer memory for playback and are then replaced by further frames. The descrambled fires are thus not written to secondary memory, which further assists in security.

It should be understood that there are a wide range of other possible applications for the present invention in addition to advertisements, trial listening and so forth. For example, the audio data may be a speech and the speaker mark certain sections as distorted and others as non-distorted to prevent unauthorised editing or tampering with a recording of the speech.

It will also be understood that a wide range of different forms of distortion generation could also be used other than scrambling and hashing. It will also be understood that the present invention could also be applied to other forms of signals than audio signals.

The invention claimed is:

1. A method of embedding watermarking data in an audio signal, comprising the steps of:
   (a) incorporating watermarking information into said audio signal, to form a watermarked audio signal,
   (b) sectioning said watermarked audio signal into at least two sections each section having audio content, each of said sections corresponding to a respective time period of said audio signal,
   (c) marking at least one of said sections whereby said sections may be identified,
   (d) generating distortion in a first one of said sections of said signal in a manner recoverable by a key obtainable from at least one other section having audio content, and
   (e) appending said distorted section to said at least one other section to form a composite signal comprising a distorted section and at least one undistorted section.

2. A method according to claim 1 wherein said key is embedded in said audio content of said at least one other section.

3. A method as claimed in claim 2 wherein the first section is distorted by means of a scrambling function.

4. A method as claimed in claim 1 wherein said key is obtained directly from a sequence of bits contained in said audio content of at least one other section.

5. A method as claimed in claim 4 wherein said key is obtained by applying a hashing function to the bit sequence of said audio content of said at least one other section.

6. A method as claimed in claim 5 wherein the output of the hashing function is added to the bitstream of said first section to create said distortion.

7. A method as claimed in claim 4 wherein a bitstream of said first section is subject to a scrambling function to create said distortion.

8. A method as claimed in claim 1 wherein said first section comprises a section to which access is to be restricted.

9. A method as claimed in claim 1 wherein said at least one other section comprises an advertisement.

10. A method as claimed in claim 1 wherein said at least one other section comprises a trial listening section.

11. A method as claimed in claim 1 wherein said at least one other section comprises an advertisement section and a trial listening section.

12. A method as claimed in claim 1 wherein said audio signal is compressed after watermarking.

13. A method as claimed in claim 12 wherein said first section of said compressed signal is distorted by means of a scrambling function that receives as a key the output of a hashing function that acts upon said at least one other section.

14. A method as claimed in claim 13 wherein said audio signal is compressed in MP3 format and said scrambling function acts upon the bits contained within MP3 frames.

15. A method of playing back an audio signal having data embedded within it by the method of claim 1, comprising;
   (a) reading said composite signal,
   (b) identifying said sections,
   (c) obtaining said key from said at least one undistorted section, and
   (d) recovering said distorted section.

16. A method as claimed in claim 15 wherein said distorted section is recovered in real time without being written to memory.

17. A watermarked audio signal stored in a non-transitory memory or a non-transitory computer readable medium comprising at least two sections, each section having audio content and corresponding to a respective time period of said audio signal, said sections including a first section which is distorted in a manner recoverable by means of a key obtainable from audio content in at least one other section.

18. A watermarked audio signal as claimed in claim 17 wherein said first section is a section to which access is restricted.

19. A watermarked audio signal as claimed in claim 17 wherein said at least one other section is an advertisement section.

20. A watermarked audio signal as claimed in claim 17 wherein said at least one other section comprises a trial listening section.

21. A watermarked audio signal as claimed in claim 17 wherein said at least one other section comprises an advertisement section and a trial listening section.

22. A non-transitory computer-readable storage medium comprising computer-executable instructions that, in response to execution, cause a system including a processer to perform operations comprising:
   incorporating watermarking , information into said audio signal to form a watermarked audio signal,
   sectioning said watermarked audio signal into at least two sections each having audio content, each section corresponding to a respective time period of said audio signal,
   marking at east one of said sections whereby said sections may be identified,
   generating distortion in one of said sections of said signal in a manner recoverable by a key obtainable from at least one other section having audio content, and
   appending said distorted section to said at least one other section to form a composite signal comprising a distorted section and at least one undistorted section.

23. A non-transitory computer-readable storage medium comprising computer-executable instructions that, in response to execution, cause a system including a processor to perform operations comprising:

incorporating watermarking information into an audio signal, to form a watermarked audio signal,     sectioning, said watermarked audio signal into at least two sections each section having audio content, each of said sections corresponding to a respective time period of said audio signal,     marking at least one of said sections whereby said sections may be indentified,     generation distortion in a first one of said sections of said signal in a manner recoverable by a key obtainable from at least one other section having audio content,     appending said distorted section to said at least one other section to form a composite signal comprising a distorted section and at least one undistorted section,     reading said composite signal,     identifying said sections,     obtaining said key from said at least one undistorted section, and     recovering said distorted section.

24. A method for including an advertisement with audio data in an audio signal comprising, providing or creating an audio signal comprising a first section having audio content and an advertisement section having audio content, said first section and said advertisement section corresponding to respective time periods of said audio signal, generating distortion of said first section in a manner recoverable by a key obtainable from said advertisement section, and appending said distorted first section to said advertisement section wherein said key is obtainable from said audio content in said advertisement section.

25. A method for including a trial listening section with audio data in an audio signal comprising, sectioning said audio signal into a first section and a trial listening section, said first section and trial listening section corresponding to respective time periods of said audio signal, generating distortion of said first section in a manner recoverable by a key obtainable from said trial listening section, and appending said distorted first section to said trial listening section, wherein the key is obtainable from audio content in said trial listening section.

26. A method for including an advertisement section and a trial listening section with audio data in an audio signal, including sectioning said signal into a first section, an advertisement section, and a trial listening section, said sections corresponding to respective time periods of said audio signal, marking at least one of said sections whereby said sections may be identified, generating distortion in said first section in a manner recoverable by a key obtainable from at least one of said advertisement and trial listening sections, and appending said distorted first section to said advertisement and trial listening sections to form a composite signal, wherein said key is obtainable from audio content in said advertisement section.

27. A method of restricting access to a part of a media signal, comprising the steps of:

(a) sectioning said signal into at least two sections each having media content, each section corresponding to a respective period of time of said signal, (b) marking at least one of said sections whereby said sections may be identified, (c) generating distortion in one of said sections of said signal in a manner recoverable by a key obtainable from or more sections having media content, wherein said key is, obtainable from said media content in said one or more other sections, and (d) appending said distorted section to said one or more other sections to form a composite signal comprising a distorted section and at least one undistorted section.

28. A method as claimed in claim 2 wherein said distortion is generated by creating a pseudo-random number sequence for adding as pseudo-random noise to said first section, and wherein said pseudo-random number sequence is embedded in said at least one other section to enable said random noise to be subsequently removed.

29. A method according to claim 28 wherein said key is embedded using a fragile data hiding technique.

\* \* \* \* \*